US012800342B2

(12) United States Patent
Huang

(10) Patent No.: US 12,800,342 B2
(45) Date of Patent: Nov. 17, 2026

(54) GRID MAP CONSTRUCTION METHOD, ROBOT AND COMPUTER-READABLE STORAGE MEDIUM

(71) Applicant: SHENZHEN PUDU TECHNOLOGY CO., LTD., Shenzhen (CN)

(72) Inventor: Yin Huang, Shenzhen (CN)

(73) Assignee: SHENZHEN PUDU TECHNOLOGY CO., LTD., Shenzhen (CN)

( * ) Notice: Subject to any disclaimer, the term of this patent is extended or adjusted under 35 U.S.C. 154(b) by 89 days.

(21) Appl. No.: 18/877,639

(22) PCT Filed: Aug. 22, 2023

(86) PCT No.: PCT/CN2023/114206
§ 371 (c)(1),
(2) Date: Dec. 20, 2024

(87) PCT Pub. No.: WO2024/139270
PCT Pub. Date: Jul. 4, 2024

(65) Prior Publication Data
US 2025/0383216 A1 Dec. 18, 2025

(30) Foreign Application Priority Data
Dec. 27, 2022 (CN) ........................ 202211680150.2

(51) Int. Cl.
*G01C 21/00* (2006.01)

(52) U.S. Cl.
CPC ..... *G01C 21/3837* (2020.08); *G01C 21/3859* (2020.08)

(58) Field of Classification Search
CPC ............ G01C 21/3804; G01C 21/3837; G01C 21/3859
See application file for complete search history.

(56) References Cited

U.S. PATENT DOCUMENTS

2006/0025888 A1* 2/2006 Gutmann ................ G06T 7/593 700/253
2020/0183011 A1* 6/2020 Lin ...................... G01S 7/4808
(Continued)

FOREIGN PATENT DOCUMENTS

CN 101000507 A 7/2007
CN 109849936 A 6/2019
(Continued)

OTHER PUBLICATIONS

PCT International Search Report and Written Opinion (w/ English translations) for corresponding PCT Application No. PCT/CN2023/114206, mailed Nov. 24, 2023, 10 pages.
(Continued)

*Primary Examiner* — Adam M Alharbi
(74) *Attorney, Agent, or Firm* — OPENPTO US LLC; Yuhao Liang

(57) ABSTRACT

In one aspect, a grid map construction method includes: acquiring a point cloud of a target scene in the current field of view; according to the point cloud in the current field of view, constructing an occupation grid map and a height grid map corresponding to each other in the current field of view; and then updating a target grid map of the target scene according to a point cloud occupation probability value of each grid in the occupation grid map and a point cloud height value of each grid in the height grid map in the current field of view.

13 Claims, 6 Drawing Sheets

(56) References Cited

U.S. PATENT DOCUMENTS

| | | | | |
|---|---|---|---|---|
| 2021/0327128 | A1 | 10/2021 | Yu et al. | |
| 2022/0215673 | A1 | 7/2022 | Fujiwara et al. | |
| 2023/0249353 | A1* | 8/2023 | Yan | B25J 9/1697 700/259 |

FOREIGN PATENT DOCUMENTS

| | | | |
|---|---|---|---|
| CN | 110221616 | A | 9/2019 |
| CN | 112543938 | A | 3/2021 |
| CN | 113324551 | A | 8/2021 |
| CN | 113358110 | | 9/2021 |
| CN | 114419573 | A | 4/2022 |
| CN | 114758063 | | 7/2022 |
| CN | 115114387 | A | 9/2022 |
| CN | 116086430 | A | 5/2023 |

OTHER PUBLICATIONS

Chinese Office Action for corresponding Application No. 202211680150.2, dated Aug. 28, 2024, 8 pages.

Qin et al., “A Modular Local Grid Map Building Algorithm for Complex Three-dimensional Environment” (w/ English abstract), Control Engineering of China, vol. 23, No. 10, Oct. 2016, 7 pages.

“Search Report of Europe Counterpart Application”, issued on Mar. 3, 2026, p. 1-p. 10.

* cited by examiner

GRID MAP CONSTRUCTION METHOD, ROBOT AND COMPUTER-READABLE STORAGE MEDIUM

CROSS REFERENCE TO RELATED APPLICATION

The present application is a US national stage application of PCT international application PCT/CN2023/114206, filed on Aug. 22, 2023, which is based on and claims priority to Chinese Patent Application with No. 202211680150.2 and filed with China National Intellectual Property Administration on Dec. 27, 2022 and titled "Grid Map Construction Method, Robot and Computer-readable Storage Medium", and the content of which is expressly incorporated herein by reference in its entirety.

TECHNICAL FIELD

The present disclosure relates to the field of robot navigation technology, and particularly to a grid map construction method, a robot and a computer-readable storage medium.

BACKGROUND

Grid map, also referred to as "static grid map", is an important form of representation of prior environmental information in the robot navigation, in which the robot operation scene is usually divided into a series of grids, and each grid is given a possible value representing a probability that the grid is occupied.

In the conventional technology, the robot converts the collected point cloud into the plane where the grid map is located, and obtains the grid map corresponding to the robot operation scene based on the distribution of the point cloud in the grid map.

However, due to the blind spots in the robot's vision caused by occlusion of spatial objects, some obstacles in the operation scene are not observed, so that the robot may directly determine that there are no obstacles in the grid when the grid map is constructed, which may result in that the obtained grid map cannot accurately reflect the actual operation scene, and thus the scene restoration degree is reduced.

SUMMARY

According to the embodiments of the present disclosure, a grid map construction method, a robot, and a computer-readable storage medium are provided.

In the first aspect of the present disclosure, a grid map construction method is provided, including:

- acquiring a point cloud of a target scene under a current field of view;
- constructing an occupancy grid map and a height grid map under the current field of view according to the point cloud under the current field of view, wherein the occupancy grid map comprises a point cloud occupancy probability value of each grid, the height grid map comprises a point cloud height value of each grid, and the occupancy grid map corresponds to the height grid map;
- updating a target grid map of the target scene according to point cloud occupancy probability values in the occupancy grid map and point cloud height values in the height grid map.

In the second aspect of the present disclosure, a robot is provided, including a processor and a memory storing a computer program. When executing the computer program, the processor is configured to implement the method of any one of the embodiments.

In the third aspect of the present disclosure, a computer-readable storage medium is provided, on which a computer program is stored. The computer program, when executed by a processor, causes the processor to implement the method of any one of the embodiments.

The details of one or more embodiments of the disclosure are set forth in the accompanying drawings and the description below. Other features and advantages of the present disclosure will be obvious from the description, drawings, and claims.

BRIEF DESCRIPTION OF THE DRAWINGS

In order to more clearly illustrate the technical solution of the present disclosure or the the prior art, accompanying drawings required for use in the embodiments or the description of the prior art will be briefly introduced below. Obviously, the drawings described below are merely some embodiments of the present disclosure, and those skilled in the art can obtain drawings of other embodiments according to these drawings without paying any creative effort.

DETAILED DESCRIPTION

In order to make the purpose, technical solution and advantages of the present disclosure more clearly understood, the present disclosure is further detailed below in conjunction with the accompanying drawings and embodiments. It should be appreciated that the specific embodiments described herein are merely used for explaining the present disclosure, rather than limiting the present disclosure.

Figure 1:
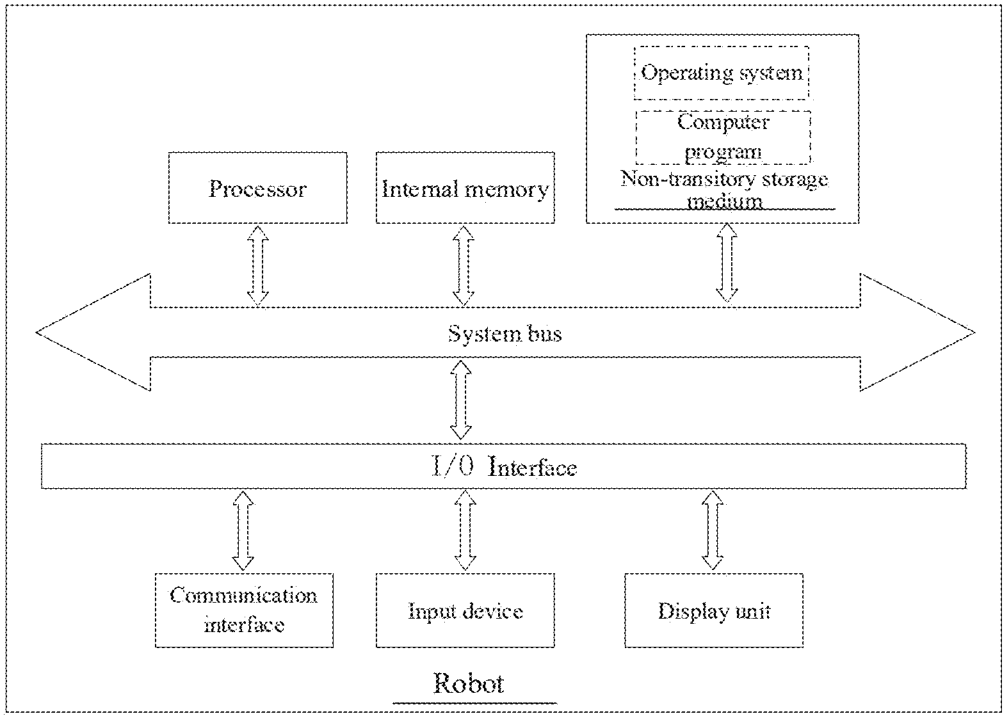
FIG. 1 is an internal structure diagram of a robot according to an embodiment.

In an embodiment of the present disclosure, a grid map construction method is provided, which can be applied to a robot, and an internal structure diagram thereof is as shown in FIG. 1. The computer device includes a processor, a memory, a communication interface, a display screen, and an input device connected to each other via a system bus. The processor of the computer device is configured to provide computing and control capabilities. The memory of the computer device includes a non-transitory storage medium and an internal memory. The non-transitory storage medium stores an operating system and a computer program. The internal memory provides an environment for the operations of the operating system and computer program in the non-transitory storage medium. The communication interface of the computer device is configured to communicate with an external terminal in a wired or wireless mode, and the wireless mode may be implemented through WIFI, a mobile cellular network, a near field communication (NFC) or other technologies. When the computer program is executed by a processor, a grid map construction method is implemented. The display screen of the robot may be a liquid crystal display screen or an electronic ink display screen, and the input device of the robot may be a touch layer covering the display screen, or a button, trackball or touchpad provided on the housing of the robot, or an external keyboard, touchpad or mouse, etc.

Those skilled in the art may understand that the structure shown in FIG. 1 is merely a block diagram of a partial structure related to the technical solution of the present disclosure, and does not constitute a limitation on the computer device to which the technical solution of the present disclosure is applied. The specific computer device may include more or fewer components than shown in the figure, or combine certain components, or have a different arrangement of components.

Figure 2:
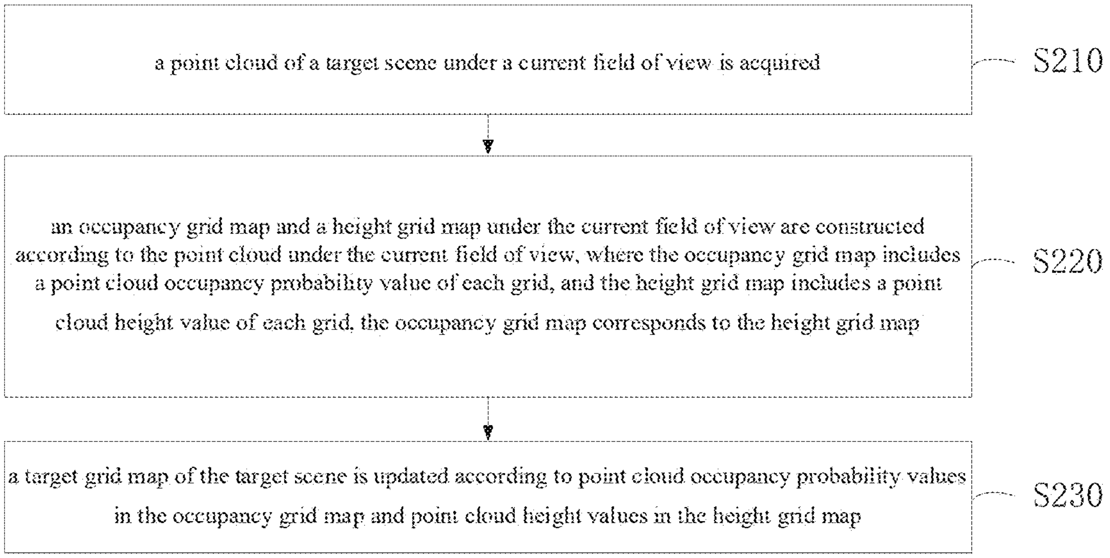
FIG. 2 is a flow chart showing a grid map construction method according to an embodiment.

In an embodiment, as shown in FIG. 2, a grid map construction method is provided, which is applied to the robot shown in FIG. 1 as an example, and includes the following steps.

S210: a point cloud of a target scene under a current field of view is acquired.

The field of view (FOV) represents an angle corresponding to a range covered by a robot lens. The target scene is a robot driving scene. The robot can move in the target scene, and the field of view of the robot may change as the robot moves.

Figure 3:
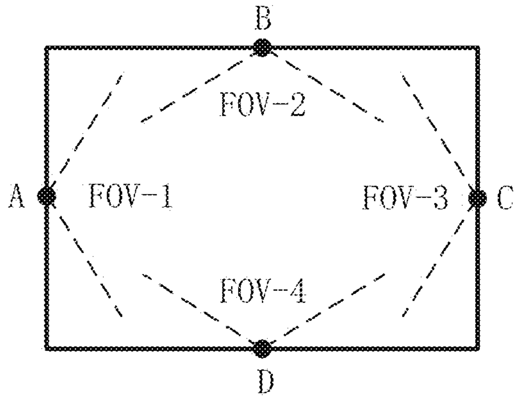
FIG. 3 is a schematic diagram of field of view generated by a robot at different positions according to an embodiment.

Optionally, the robot may acquire the point cloud of the target scene under the current field of view through a camera device (such as an RGBD camera) carried by the robot itself during the movement. The robot can specifically circle the target scene and acquire point clouds under multiple different current fields of view, that is, the current field of view may change continuously as the robot moves. For example, as shown in FIG. 3, the rectangular area represents the target scene, and the robot can move clockwise around the boundary of the rectangular area and acquire point clouds under four correspond fields of view FOV-1, FOV-2, FOV-3, and FOV-4 at four positions A, B, C, and D respectively.

In other embodiments, the point cloud of the target scene under the current field of view can alternatively be acquired by a laser radar device carried by the robot itself, which is not limited here.

S220: an occupancy grid map and a height grid map under the current field of view are constructed according to the point cloud under the current field of view.

The occupancy grid map may include a point cloud occupancy probability value of each grid, and the height grid map may include a point cloud height value of each grid. The occupancy grid map corresponds to the height grid map, that is, both have the grids of an identical specification, such as the same grid size and resolution.

It should be noted that the occupancy grid map reflects a distribution of the point cloud, which can be independently determined based on the point cloud under independent field of view. The point cloud occupancy probability value represents a possibility that a grid is occupied by the point cloud. The height grid map reflects height information of the point cloud, which can be determined based on accumulation of point clouds under the existing field of view. The point cloud height value refers to a spatial coordinate height of the point cloud within the grid.

Optionally, the robot, in acquisition of the point cloud under the current field of view, maps the point cloud under the current field of view to a grid plane (generally the ground), determines a point cloud occupancy probability value of each grid in the grid plane according to the distribution of the point cloud in the grid plane after mapping, and determines a point cloud height value of each grid according to the spatial coordinate height of the point cloud in each grid under the existing field of view.

For the point clouds under different current fields of view, the occupancy grid maps and the height grid maps under different current fields of view can be obtained. Continuing with the above example, for FOV-1, the occupancy grid map M-1 and the height grid map H-1 are obtained; for FOV-2, the occupancy grid map M-2 and the height grid map H-2 are obtained; for FOV-3, the occupancy grid map M-3 and the height grid map H-3 are obtained; and for FOV-4, the occupancy grid map M-4 and the height grid map H-4 are obtained.

S230: a target grid map of the target scene is updated according to point cloud occupancy probability values in the occupancy grid map and point cloud height values in the height grid map.

Optionally, after obtaining the occupancy grid map and the height grid map under the current field of view, the robot can compare the point cloud height value of each grid in the height grid map to a height threshold value, and update a point cloud occupancy probability value of a grid at a corresponding position in an existing target grid map of the target scene according to a comparison result, and then obtain an updated target grid map of the target scene.

Optionally, for a single grid, when the comparison result indicates that the point cloud height value is greater than the height threshold value, a target probability value of a grid at a corresponding position in the occupancy grid map is comprehensively determined according to the point cloud occupancy probability value of the grid at the corresponding position in the occupancy grid map, and the target probability value is adopted to update the point cloud occupancy probability value of the grid at the corresponding position in the existing target grid map. Optionally, for a single grid, when the comparison result indicates that the point cloud height is less than or equal to the height threshold value, the point cloud occupancy probability value of the grid at the corresponding position in the existing target grid map is maintained.

In the embodiment, the robot acquires the point cloud of the target scene under the current field of view, and constructs the occupancy grid map and height grid map corresponding to each other under the current field of view according to the point cloud under the current field of view, and then updates the target grid map of the target scene according to the point cloud occupancy probability value of each grid in the occupancy grid map and the point cloud height value of each grid in the height grid map. In the above method, the cloud occupancy probability value and point cloud height value determined based on the occupancy grid map and the height grid map under the current field of view of the robot are adopted to continuously update the point cloud occupancy probability value of the grid at the corresponding position in the existing target grid map. By continuously updating the target grid map, not only the blind spot caused by the occlusion is avoided, but also the actual operation scene of the robot can be more accurately reflected, thereby greatly improving the scene restoration degree.

The point cloud under the current field of view correspondingly forms an occupancy grid map and a height grid map under the current field of view.

Figure 4:
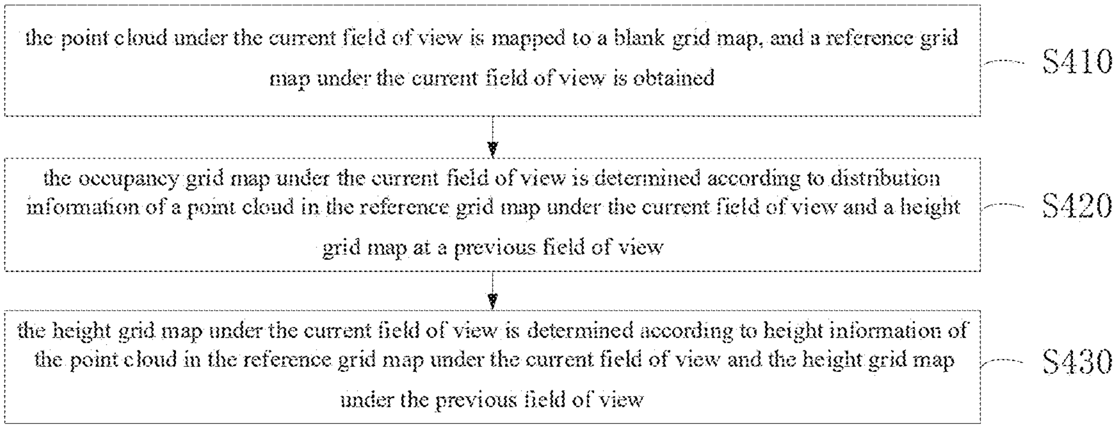
FIG. 4 is a flow chart of constructing an occupancy grid map and a height grid map according to an embodiment.

In an embodiment, as shown in FIG. 4, the above-mentioned step S220 of constructing the occupancy grid map and the height grid map under the current field of view according to the point cloud under the current field of view may include the following steps.

S410: the point cloud under the current field of view is mapped to a blank grid map, and a reference grid map under the current field of view is obtained.

The blank grid map refers to a grid map corresponding to, i.e., having the same specifications as the occupancy grid map and the height grid map. Optionally, the blank grid map excludes a parameter value corresponding to each grid, or the parameter value corresponding to each grid is equal to 0.

Figure 5:
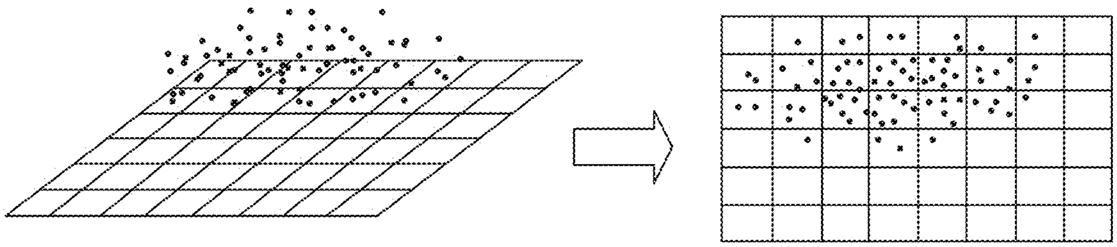
FIG. 5 is a schematic process diagram of forming a reference grid map according to an embodiment.

Optionally, the robot maps the point cloud under the current field of view to the blank grid map and obtains the reference grid map under the current field of view. FIG. 5 is a schematic process diagram of mapping a point cloud under a current field of view to a blank grid map to form a reference grid map under the corresponding field of view. The robot may specifically convert the point cloud under the current field of view from a camera coordinate system to a robot coordinate system according to external parameters of an acquisition device (using the camera coordinate system), and then the point cloud is converted from the robot coordinate system to a world coordinate system according to a position and orientation of the robot in the world coordinate system, and finally the point cloud is converted from the world coordinate system to a map coordinate system according to a resolution of the blank grid map, thereby mapping points to the blank grid map and obtaining the reference grid map under the corresponding current field of view.

S420: the occupancy grid map under the current field of view is determined according to distribution information of a point cloud in the reference grid map under the current field of view and a height grid map under a previous field of view.

Optionally, for the reference grid map under the current field of view, the robot can determine a point cloud occupancy probability value of a corresponding grid according to distribution information of a point cloud in each grid in the reference grid map, to form the occupancy grid map including the point cloud occupancy probability value of each grid based on the blank grid map.

Optionally, the robot may determine, according to whether a point cloud exists in each grid in the reference grid map, the point cloud occupancy probability value of the corresponding grid. For example, in case that a point cloud exists in a grid, the point cloud occupancy probability value of the grid is determined as 255; in case that there is no point cloud in the grid, the point cloud occupancy probability value of the grid is determined as 0, where 0≤point cloud occupancy probability value≤255.

S430: the height grid map under the current field of view is determined according to height information of the point cloud in the reference grid map under the current field of view and the height grid map under the previous field of view.

Optionally, for the reference grid map under the current field of view, the robot can determine a point cloud height value of a corresponding grid according to height information of a point cloud in each grid in the reference grid map and the height grid map under the previous field of view, to form the height grid map including the point cloud height value of each grid based on the blank grid map.

Optionally, the robot traverses the point cloud in each grid in the reference grid map and acquires spatial coordinate heights of each point cloud, and determines a maximum height therefrom as the point cloud height value of the corresponding grid.

In the embodiment, the point cloud under the current field of view is mapped to the blank grid map to obtain the reference grid map under the current field of view; the occupancy grid map under the current field of view is determined according to the distribution information of the point cloud in the reference grid map under the current field of view; the height grid map under the current field of view is determined according to the height information of the point cloud in the reference grid map under the current field of view and the height grid map under the previous field of view. By the above method, the occupancy grid map and the height grid map including information of different dimensions under the current field of view can be obtained, which provides data preparation for the subsequent construction of the target grid map of the target scene, thereby improving the scene restoration degree of the target grid map.

In practical applications, the occupancy grid map can be determined according to whether a grid includes a point cloud.

Figure 6:
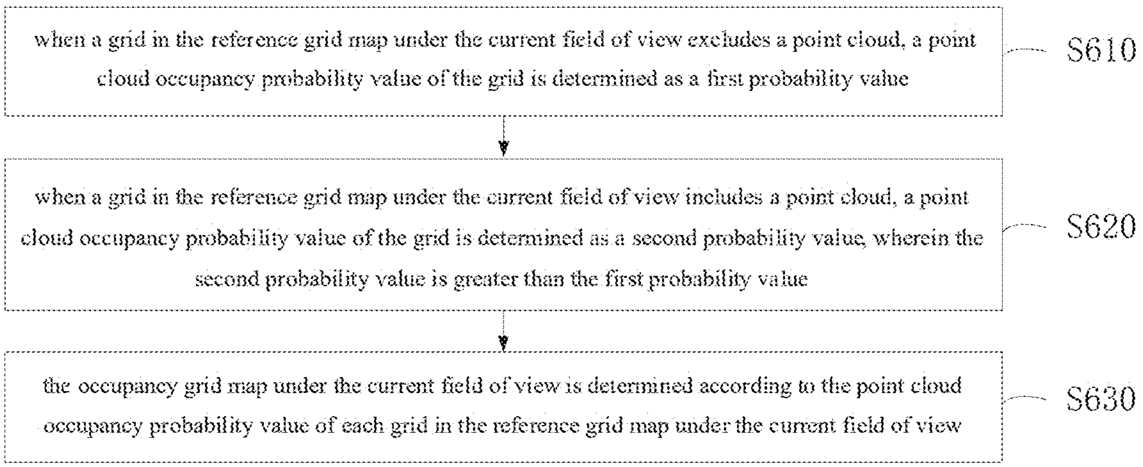
FIG. 6 is a flow chart of forming an occupancy grid map according to an embodiment.

In an embodiment, as shown in FIG. 6, the above step S420 of determining the occupancy grid map under the current field of view according to the distribution information of the point cloud in the reference grid map under the current field of view may includes the following steps.

S610: when a grid in the reference grid map under the current field of view excludes a point cloud, a point cloud occupancy probability value of the grid is determined as a first probability value.

S620: when a grid in the reference grid map under the current field of view includes a point cloud, a point cloud occupancy probability value of the grid is determined as a second probability value.

The second probability value is greater than the first probability value.

Optionally, for the reference grid map under the current field of view, the robot determines whether each grid in the reference grid map includes a point cloud, and then determines a point cloud occupancy probability value of each grid in the reference grid map. When a grid excludes a point cloud, a smaller point cloud occupancy probability value is assigned to the grid, such as the first probability value; when a grid includes a point cloud, a larger point cloud occupancy probability value is assigned to the grid, such as the second probability value. The first probability value may be equal to 0, the second probability value may be equal to 255, and a preset quantity threshold value may be equal to 1 or other specific values. In the embodiment, there is no specific restriction on the first probability value and the second probability value, which can be set according to experiences and requirements.

S630: the occupancy grid map under the current field of view is determined according to the point cloud occupancy probability value of each grid in the reference grid map under the current field of view.

Optionally, after the robot obtains the point cloud occupancy probability value of each grid in the reference grid map under the current field of view, each point cloud occupancy probability value is filled into a corresponding grid in the blank grid map to obtain the occupancy grid map under the current field of view.

In the embodiment, for the current field of view, the robot assigns different point cloud occupancy probability values to corresponding grids by determining whether each grid in the reference grid map includes a point cloud, accordingly the occupancy grid map under the current field of view is obtained. Specifically, when the grid excludes a point cloud, the point cloud occupancy probability value may be determined as the smaller first probability value; and when the grid includes a point cloud, the point cloud occupancy probability value may be determined as the larger second probability value. In the above method, the corresponding point cloud occupancy probability value is determined according to whether each grid in the reference grid map includes a point cloud. Since whether the grid includes a point cloud can accurately reflect whether the grid is occupied by a point cloud, accordingly the above method improves the accuracy of the determined occupancy grid map.

Figure 7:
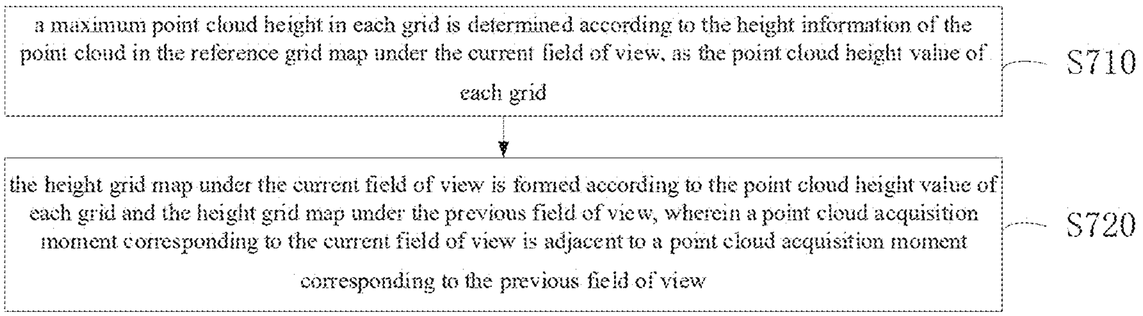
FIG. 7 is a flow chart of forming a height grid map according to an embodiment.

The height grid map is determined based on the accumulation of point clouds under existing fields of view. Based on this, as shown in FIG. 7, the above step S430 of determining the height grid map under the current field of view according to the height information of the point cloud in the reference grid map under the current field of view and the height grid map under the previous field of view may include the follow steps.

S710: a maximum point cloud height in each grid is determined according to the height information of the point cloud in the reference grid map under the current field of view, as the point cloud height value of each grid.

Optionally, the robot determines spatial coordinate heights of a point cloud in one grid are determined according to the height information of the point cloud in the reference grid map under the current field of view, and determines a maximum point cloud height from the spatial coordinate heights, and takes the maximum point cloud height as the point cloud height value of the corresponding grid, accordingly the point cloud height value of each grid is obtained.

S720: the height grid map under the current field of view is formed according to the point cloud height value of each grid and the height grid map under the previous field of view.

A point cloud acquisition moment corresponding to the current field of view is adjacent to a point cloud acquisition moment corresponding to the previous field of view. When the current field of view corresponds to a first acquisition of the point cloud, the height grid map under the previous field of view is the blank grid map.

Optionally, for a current field of view corresponding to a non-first acquisition of the point cloud, there exists a previous field of view of the current field of view at which the point cloud is acquired. When determining the height grid map under the current field of view, the robot may acquire a height grid map under the previous field of view of the current field of view in advance, and update a point cloud height value of a grid at a corresponding position in the height grid map under the previous field of view according to the point cloud height value of each grid under the current field of view, to form the height grid map under the current field of view. For the current field of view corresponding to the first acquisition of the point cloud, when determining the height grid map under the current field of view, the robot may directly determine the point cloud height value of each grid under the current field of view as a point cloud height value of a grid at a corresponding position in the blank grid map, to form the height grid map under the current field of view.

Figure 8:
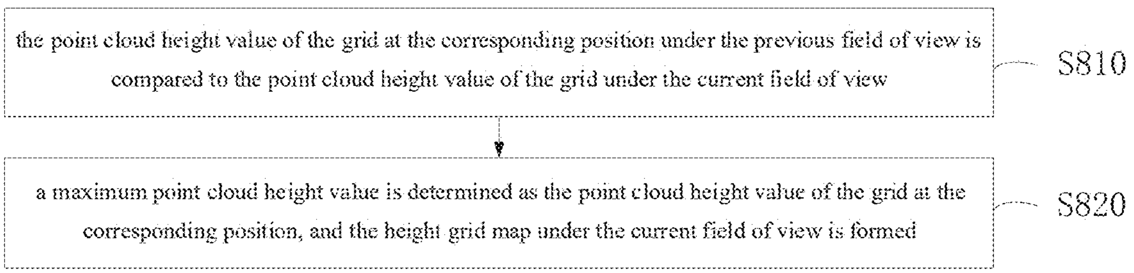
FIG. 8 is a flow chart of forming a height grid map according to another embodiment.

In an optional embodiment, as shown in FIG. 8, the above step S720 of forming the height grid map under the current field of view according to the point cloud height value of each grid and the height grid map under the previous field of view, may include the following steps.

S810: the point cloud height value of the grid at the corresponding position under the previous field of view is compared to the point cloud height value of the grid under the current field of view.

Optionally, after obtaining the point cloud height value of each grid under the current field of view and the height grid map under the previous field of view, the robot compares the point cloud height value of the grid at the corresponding position under the previous field of view to the point cloud height value of the grid under the current field of view, to determine the point cloud height value of the grid at the corresponding position according to a comparison result.

S820: a maximum point cloud height value is determined as the point cloud height value of the grid at the corresponding position, and the height grid map under the current field of view is formed.

Optionally, for each grid, after the comparison result between the point cloud height value of the grid at the corresponding position under the current field of view and the point cloud height value of the grid under the previous field of view is obtained, the robot can determine the maximum point cloud height value as the point cloud height value of the grid at the corresponding position, thereby forming the height grid map under the current field of view.

In the embodiment, the robot acquired the maximum point cloud height value in each grid in the reference grid map under the current field of view as the point cloud height value of each grid, and forms the height grid map under the current field of view according to the height grid map under the previous field of view and the point cloud height value of each grid under the current field of view. Specifically, the point cloud height value of the grid at the corresponding position under the previous field of view is compared to the point cloud height value of the grid under the current field of view, to determine the maximum point cloud height value as the point cloud height value of the grid at the corresponding position, and form the height grid map under the current field of view. In the process of forming the height grid map under the current field of view, different field of view are taken into account by accumulating the current field of view and the field of view angle corresponding to a previous frame, thereby avoiding blind spots caused by occlusion. As the accumulation of more and more current field of view, the height grid map is iteratively updated, thereby improving the accuracy of the height grid map.

The target grid map of the target scene is continuously updated iteratively.

Figure 9:
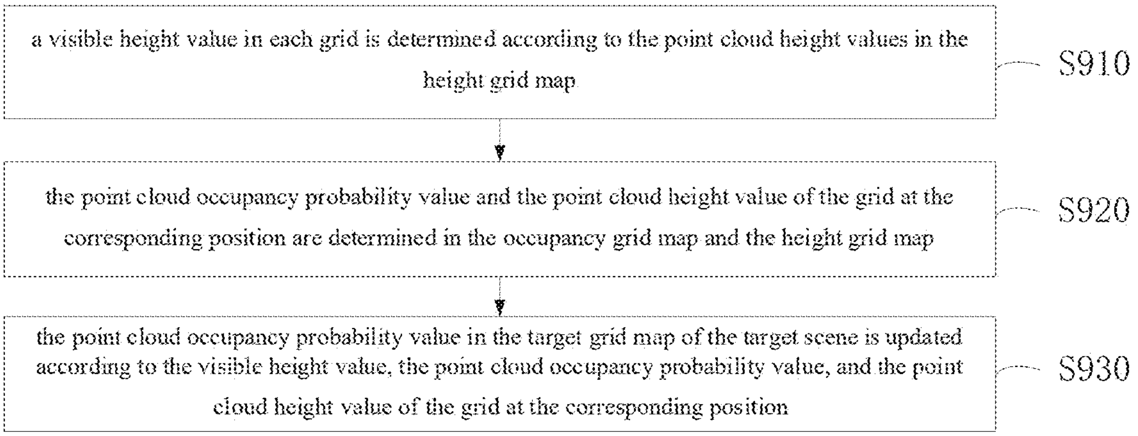
FIG. 9 is a flow chart of updating a target grid map according to an embodiment.

In an embodiment, as shown in FIG. 9, the above step S230 of updating the target grid map of the target scene according to the point cloud occupancy probability values in the occupancy grid map and the point cloud height values in the height grid map under the current field of view, may include:

S910: a visible height value in each grid is determined according to the point cloud height values in the height grid map.

The visible height is a minimum height that can be seen by the robot under the current field of view. For the same grid, since point cloud height values of surrounding grids are different, the visible heights determined under different current fields of view may be different.

Optionally, for the current field of view, after obtaining the height grid map under the current field of view, the robot further estimates a visible height value in each grid according to point cloud height values of surrounding grids of each grid in accordance with an estimation criterion. The estimation criterion may include that a visible height of a rear grid is greater than or equal to a visible height/point cloud height value of a front grid in a direction corresponding to the field of view.

Figure 10:
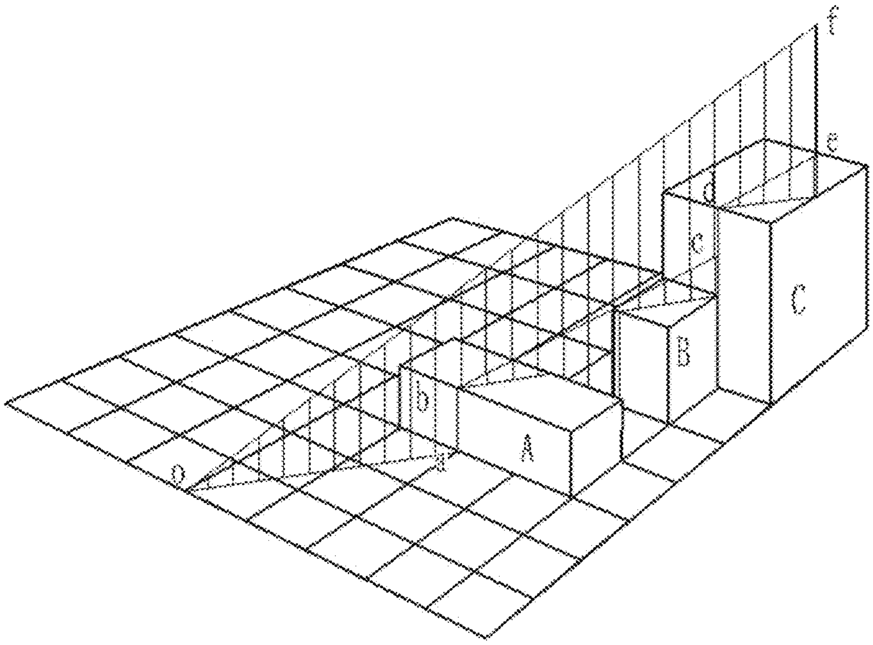
FIG. 10 is a schematic diagram illustrating an actual application scene according to an embodiment.
Figure 11:
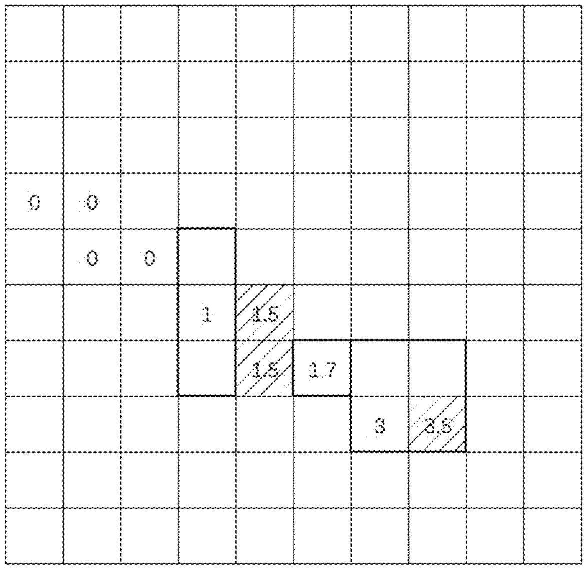
FIG. 11 is a schematic diagram illustrating a height grid map including point cloud height values of some grids according to an embodiment.

Optionally, based on the above estimation criterion, a geometric algorithm may be adopted to estimate the visible height of the grid intersecting a longitudinal section based on intersection information of the longitudinal section where a ray in the direction corresponding to the field of view is located and a spatial object in the target scene. For example, as shown in FIG. 10, a point o represents a position of the robot, a projection of the FOV formed based on the point o on the two-dimensional map is a fan-shaped projection, and a ray oe on the FOV is taken for illustration. A starting point of the ray is the robot origin o, and ef represents a maximum detection position of the robot. The ray corresponds to a longitudinal section in the space (i.e., a shaded area in the figure), the longitudinal section intersects the space object (such as A, B, C in the figure) to form line segments oabcde. The visible height of the relevant grid is estimated through the geometric algorithm, as shown in FIGS. 10 and 11. An area below the line segments oabcde is a robot invisible area, while an area between the line segments oabcde and the line segment of is a robot visible area. For a grid with a point cloud height value unequal to 0, the point cloud height value of the grid is a visible height of the grid. For a grid with a point cloud height value equal to 0, the geometric algorithm can be adopted to estimate the visible height of the grid based on the estimation criterion (point cloud height values of grids in the shaded area shown in FIG. 11 are obtained by estimation).

S920: the point cloud occupancy probability value and the point cloud height value of the grid at the corresponding position are determined in the occupancy grid map and the height grid map.

Figure 12:
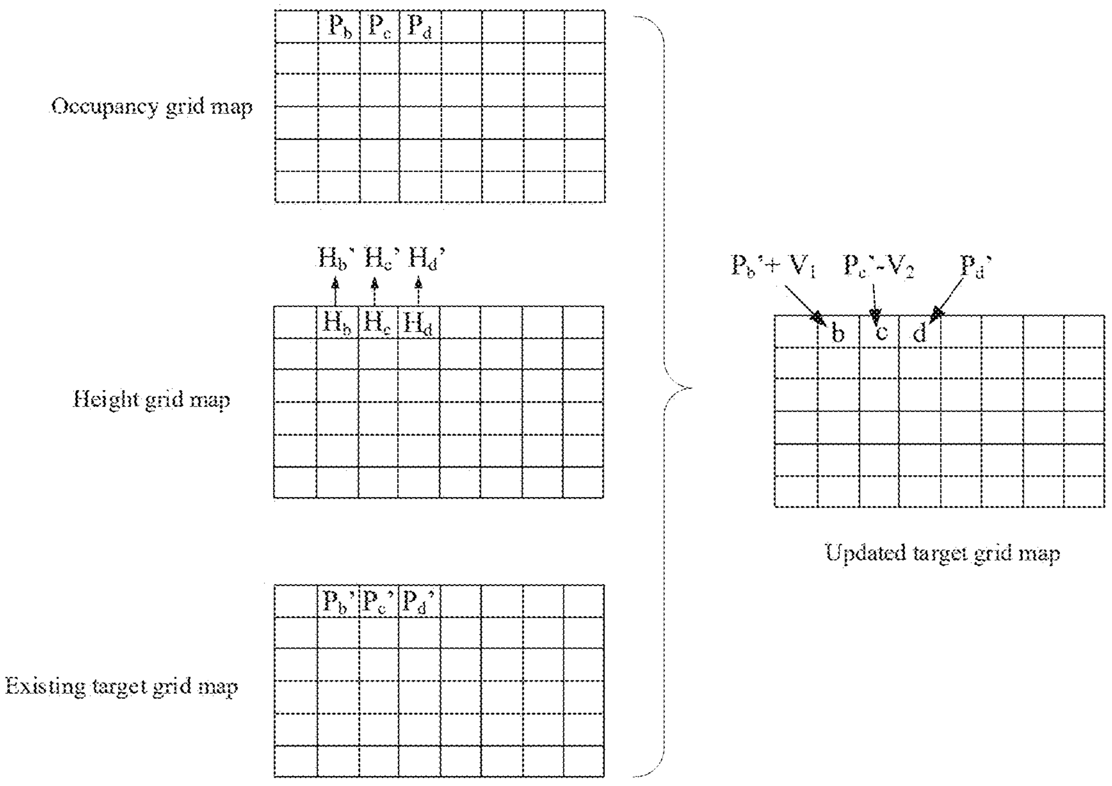
FIG. 12 is a schematic process diagram of updating a target grid map according to an embodiment.

Optionally, for the occupancy grid map and the height grid map under the current field of view, the robot acquired the point cloud occupancy probability value and the point cloud height value of the grid at the corresponding position grid from the occupancy grid map and the height grid map. As shown in FIG. 12, for a grid b, the point cloud occupancy probability value $P_b$ of the grid b is obtained in the occupancy grid map, and the point cloud height value $H_b$ of grid b is obtained in the height grid map. For a grid c, the point cloud occupancy probability value $P_c$ of the grid c is obtained in the occupancy grid map, and the point cloud height value $H_c$ of the grid c is obtained in the height grid map. For a grid d, the point cloud occupancy probability value $P_d$ of the grid d is obtained in the occupancy grid map, and the point cloud height value $H_d$ of the grid d is obtained in the height grid map.

S930: the point cloud occupancy probability value in the target grid map of the target scene is updated according to the visible height value, the point cloud occupancy probability value, and the point cloud height value of the grid at the corresponding position.

When the current field of view corresponds to the first acquisition of the point cloud, the target grid map is the blank grid map. When the current field of view corresponds to the non-first acquisition of the point cloud, the target grid map is determined under the previous field of view.

Optionally, after obtaining the visible height, the point cloud occupancy probability value, and the point cloud height value of the grid at the corresponding position, the robot can update the point cloud occupancy probability value of the grid at the corresponding position in the target grid map according to the visible height, the point cloud occupancy probability value, and the point cloud height value of the grid at the corresponding position.

Figure 13:
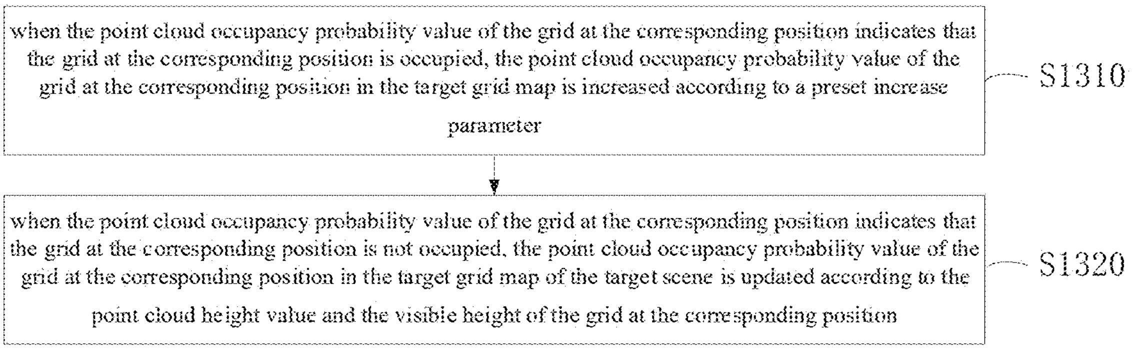
FIG. 13 is a schematic process diagram of updating a target grid map according to another embodiment.

In an optional embodiment, as shown in FIG. 13, the above step S930 of updating the point cloud occupancy probability value of the grid at the corresponding position in the target grid map according to the visible height, the point cloud occupancy probability value, and the point cloud height value of the grid at the corresponding position may include the following steps.

S1310: when the point cloud occupancy probability value of the grid at the corresponding position indicates that the grid at the corresponding position is occupied, the point cloud occupancy probability value of the grid at the corresponding position in the target grid map is increased according to a preset increase parameter.

The point cloud occupancy probability value can be configured to indicate that the grid is occupied by the point cloud, or can also be configured to indicate that the grid is not occupied by the point cloud, which is determined by the specific point cloud occupancy probability value.

Optionally, the robot may compare the point cloud occupancy probability value to a preset probability value. When the point cloud occupancy probability value is greater than the preset probability value, the point cloud occupancy probability value is configured to indicate that the grid is occupied; conversely, when the point cloud occupancy probability value is less than or equal to the preset probability value, the point cloud occupancy probability value is configured to indicate that the grid is not occupied. In the above-mentioned embodiment, the first probability value is configured to indicate that the grid is not occupied, and the second probability value is configured to indicate that the grid is occupied.

Optionally, the robot acquires the point cloud occupancy probability value of the grid at the corresponding position and compares the point cloud occupancy probability value to the preset probability value. When the point cloud occupancy probability value is greater than the preset probability value, it indicates that the grid at the corresponding position is occupied, and then the point cloud occupancy probability value of the grid at the corresponding position in the target grid map is increased. Specifically, a preset increase parameter may be used for the increase, and the preset increase parameter may be an increase stride or an increase coefficient. Continuing with the example in FIG. 12, when the point cloud occupancy probability value $P_b$ of the grid b is equal to a second grid value (such as 255), it indicates that grid b is occupied, the robot may increase the point cloud occupancy probability value $P_b'$ of grid b in the target grid map according to the preset increase stride $V_1$, and obtains the updated point cloud occupancy probability value $P_b'+V_1$ of the grid b. When the updated point cloud occupancy probability value $P_b'+V_1$ is greater than the maximum probability value $P_{max}$, $P_b'+V_1$ is directly replaced by $P_{max}$. Optionally, $P_{max}=255$.

In an optional embodiment, $V_1$ may be equal to 20.

In other embodiments, $P_{max}$ and $V_1$ may be equal to other values, which are not limited here.

Optionally, each time the point cloud is updated, the target grid map is updated.

S1320: when the point cloud occupancy probability value of the grid at the corresponding position indicates that the grid at the corresponding position is not occupied, the point cloud occupancy probability value of the grid at the corresponding position in the target grid map of the target scene is updated according to the point cloud height value and the visible height of the grid at the corresponding position.

Optionally, the robot acquires the point cloud occupancy probability value of the grid at the corresponding position and compares the point cloud occupancy probability value to the preset probability value. When the point cloud occupancy probability value is less than or equal to the preset probability value, it indicates that the grid at the corresponding position is not occupied, and the point cloud occupancy probability value of the grid at the corresponding position in the target grid map is updated according to the point cloud height value and visible height of the grid at the corresponding position. Continuing with the example in FIG. 12, when the point cloud occupancy probability value $P_c$ of the grid c is equal to a first grid value (such as 0), it indicates that grid c is not occupied, and the robot updates the point cloud occupancy probability value $P_c'$ of the grid c in the existing target grid map according to the point cloud height value $H_c$ and visible height $H_c'$ of grid c.

Figure 14:
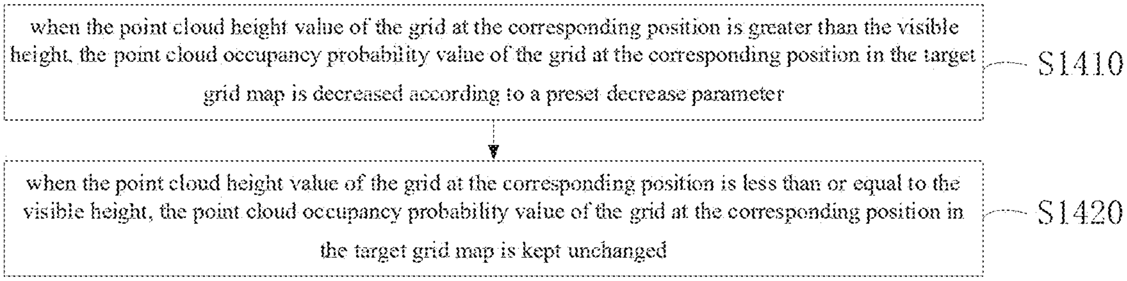
FIG. 14 is a schematic process diagram of updating a target grid map according to another embodiment.

In an optional embodiment, as shown in FIG. 14, the above step S1320 of updating the point cloud occupancy probability value of the grid at the corresponding position in the target grid map of the target scene according to the point cloud height value and visible height of the grid at the corresponding position when the point cloud occupancy probability value of the grid at the corresponding position indicates that the grid at the corresponding position is not occupied may include the following steps.

S1410: when the point cloud height value of the grid at the corresponding position is greater than the visible height, the point cloud occupancy probability value of the grid at the corresponding position in the target grid map is decreased according to a preset decrease parameter.

Optionally, the robot compares the point cloud height value of the grid at the corresponding position to the visible height, and updates the point cloud occupancy probability value of the grid at the corresponding position in the target grid map of the target scene according to the comparison result.

Optionally, when the point cloud height value of the grid at the corresponding position is greater than the visible height, the point cloud occupancy probability value of the grid at the corresponding position in the target grid map is decreased. Specifically, a preset decrease parameter may be used for reduction, and the preset decrease parameter may be a reduction stride or a reduction coefficient. Continuing with the example in FIG. 12, when the point cloud height value $H_c$ of the grid c is greater than the visible height $H_c'$, it indicates that grid c under the current field of view may include a point cloud, but the point cloud occupancy probability value $P_c$ indicates that the grid is not occupied. Since the height grid map is accumulated over a plurality of fields of view, there is a situation where the point cloud no longer exists (the target is moved away) but the height grid map still exists. At the moment, the robot reduces the point cloud occupancy probability value $P_c'$ of the grid c in the target grid map according to the preset reduction stride $V_2$, and obtains the updated point cloud occupancy probability value $P_c'-V_2$ of the grid c. When the updated point cloud occupancy probability value $P_c'-V_2$ is less than the minimum probability value $P_{min}$, $P_c'-V_2$ is directly replaced by $P_{min}$. Optionally, $P_{min}=0$.

S1420: when the point cloud height value of the grid at the corresponding position is less than or equal to the visible height, the point cloud occupancy probability value of the grid at the corresponding position in the target grid map is kept unchanged.

Optionally, when the point cloud height value of the grid at the corresponding position is less than or equal to the visible height, the robot keeps the point cloud occupancy probability value of the grid at the corresponding position in the target grid map unchanged. For example, as shown in FIG. 12, for the grid d, the point cloud occupancy probability value (such as 0) of the grid d in the occupancy grid map indicates that the grid d is not occupied by the point cloud, the point cloud height value $H_d$ of the grid d is compared to the corresponding visible height $H_d'$. Assuming that $H_d=H_d'=0$, the robot keeps the point cloud occupancy probability value $P_d'$ of the grid d in the target grid map unchanged.

In a specific scene, when there are two tables, one higher and one lower, and when the robot is located on a side of the lower table away from the higher table, the robot can obtain a point cloud of the lower table and a partial point cloud of the higher table. However, when the robot is located on a side of the higher table away from the lower table, the robot can only obtain the point cloud of the higher table.

When the robot is located on the side of the lower table away from the higher table, the height value of the partial point cloud corresponding to the higher table is greater than the visible height. Accordingly, if the higher table is changed (such as being moved), the robot can observe it and update a point cloud occupancy probability value of a corresponding grid in the target grid map thereof.

When the robot is located on the side of the higher table away from the lower table, the robot cannot see the point cloud of the lower table, that is, the height value of the point cloud corresponding to the lower table is less than the visible height, so that the point cloud occupancy probability value is not updated to prevent an erroneous update.

In the embodiment, the robot determines the visible height value in each grid according to the point cloud height values in the height grid map, and determines the point cloud occupancy probability value and the point cloud height value of the grid at the corresponding position in the occupancy grid map and the height grid map, and then updates the point cloud occupancy probability value in the target grid map of the target scene according to the visible height, the point cloud occupancy probability value, and the point cloud height value of the grid at the corresponding position, to obtain the updated target grid map. Specifically, the point cloud occupancy probability value of the grid at the corresponding position in the target grid map is increased or decreased according to the visible height, the point cloud occupancy probability value, and the point cloud height value of the grid at the corresponding position. By the above method, the point cloud occupancy probability value of the grid at the corresponding position in the target grid map can be updated continuously, to obtain an updated target grid map with a higher scene restoration degree in which the blind spots caused by occlusion are avoided.

It should be appreciated that, although the steps in the flow charts involved in the embodiments described above are displayed sequentially as indicated by the arrows, these steps are not definitely executed sequentially in the order indicated by the arrows. Unless otherwise specified herein, there is no strict limitation on the sequence of the execution of these steps, and these steps may be executed in other orders. Moreover, at least a part of the steps in the flow charts involved in the embodiments described above may include multiple steps or multiple stages. These steps or stages are not definitely executed at the same time, but can be executed at different moments. These steps or stages are not definitely executed in sequence, but can be executed in turn or alternately with other steps or at least part of the steps or stages in other steps.

Figure 15:
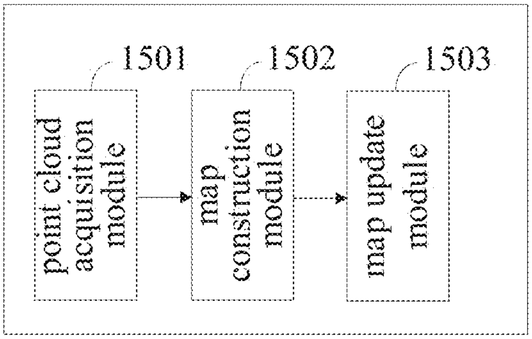
FIG. 15 is a structural block diagram of a grid map construction apparatus according to an embodiment.

In an embodiment, as shown in FIG. 15, a grid map construction apparatus is provided, which may include: a point cloud acquisition module 1501, a map construction module 1502, and a map update module 1503.

The point cloud acquisition module 1501 is configured to acquire a point cloud of a target scene under a current field of view.

The map construction module 1502 is configured to construct an occupancy grid map and a height grid map under the current field of view according to the point cloud under the current field of view; the occupancy grid map may include a point cloud occupancy probability value of each grid, and the height grid map may include a point cloud height value of each grid; the occupancy grid map corresponds to the height grid map.

The map update module 1503 is configured to update a target grid map of the target scene according to point cloud occupancy probability values in the occupancy grid map and point cloud height values in the height grid map.

In an embodiment, the map construction module 1502 is specifically configured to:

map the point cloud under the current field of view to a blank grid map, and obtain a reference grid map under the current field of view; determine the occupancy grid map under the current field of view according to distribution information of a point cloud in the reference grid map under the current field of view; and determine the height grid map under the current field of view according to height information of the point cloud in the reference grid map under the current field of view and a height grid map under a previous field of view.

In an embodiment, the map construction module 1502 is specifically configured to:

when a grid in the reference grid map under the current field of view excludes a point cloud, determine a point cloud occupancy probability value of the grid as a first probability value; when a grid in the reference grid map under the current field of view includes a point cloud, determine a point cloud occupancy probability value of the grid as a second probability value, where the second probability value is greater than the first probability value; and determine the occupancy grid map under the current field of view according to the point cloud occupancy probability value of each grid in the reference grid map under the current field of view.

In an embodiment, the map construction module 1502 is specifically configured to:

determine a maximum point cloud height in each grid according to the height information of the point cloud in the reference grid map under the current field of view, as the point cloud height value of each grid; and form the height grid map under the current field of view according to the point cloud height value of each grid and the height grid map under the previous field of view, where a point cloud acquisition moment corresponding to the current field of view is adjacent to a point cloud acquisition moment corresponding to the previous field of view.

In an embodiment, the map construction module 1502 is specifically configured to:

compare the point cloud height value of the grid at the corresponding position under the previous field of view to the point cloud height value of the grid under the current field of view, determine a maximum point cloud height value as the point cloud height value of the grid at the corresponding position, and form the height grid map under the current field of view.

In an embodiment, the map update module 1503 is specifically configured to: determine a visible height value in each grid according to the point cloud height values in the height grid map; determine the point cloud occupancy probability value and the point cloud height value of the grid at the corresponding position in the occupancy grid map and the height grid map; update the point cloud occupancy probability value in the target grid map of the target scene according to the visible height value, the point cloud occupancy probability value, and the point cloud height value of the grid at the corresponding position, where the target grid map is the blank grid map when the current field of view corresponds to a first acquisition of the point cloud, and the target grid map is determined under the previous field of view when the current field of view corresponds to a non-first acquisition of the point cloud.

In an embodiment, the map update module 1503 is specifically configured to: increase the point cloud occupancy probability value of the grid at the corresponding position in the target grid map according to a preset increase parameter when the point cloud occupancy probability value of the grid at the corresponding position indicates that the grid at the corresponding position is occupied; and update the point cloud occupancy probability value of the grid at the corresponding position in the target grid map according to the point cloud height value and the visible height of the grid at the corresponding position when the point cloud occupancy probability value of the grid at the corresponding position indicates that the grid at the corresponding position is not occupied.

In an embodiment, the map update module 1503 is specifically configured to: decrease the point cloud occupancy probability value of the grid at the corresponding position in the target grid map according to a preset decrease parameter when the point cloud height value of the grid at the corresponding position is greater than the visible height; and keep the point cloud occupancy probability value of the grid at the corresponding position in the target grid map unchanged when the point cloud height value of the grid at the corresponding position is less than or equal to the visible height.

The modules in the above-mentioned grid map construction apparatus can be fully or partially implemented by software, hardware or a combination thereof. The above modules may be embedded in or independent of a processor in a computer device in the form of hardware, or may be stored in a memory in a computer device in the form of software, so that the processor can invoke and execute operations corresponding to the above modules.

In an embodiment, a robot is provided, including a processor and a memory storing a computer program. The processor, when executing the computer program, may implement the following steps of:

acquiring a point cloud of a target scene under a current field of view; constructing an occupancy grid map and a height grid map under the current field of view according to the point cloud under the current field of view, where the occupancy grid map includes a point cloud occupancy probability value of each grid, the height grid map includes a point cloud height value of each grid, and the occupancy grid map corresponds to the height grid map; updating a target grid map of the target scene according to point cloud occupancy probability values in the occupancy grid map and point cloud height values in the height grid map.

In an embodiment, the processor, when executing the computer program, may further implement the following steps of:

mapping the point cloud under the current field of view to a blank grid map, and obtaining a reference grid map under the current field of view; determining the occupancy grid map under the current field of view according to distribution information of a point cloud in the reference grid map under the current field of view and a height grid map at a previous field of view; and determining the height grid map under the current field of view according to height information of the point cloud in the reference grid map under the current field of view and the height grid map under the previous field of view.

In an embodiment, the processor, when executing the computer program, may further implement the following steps of:

when a grid in the reference grid map under the current field of view excludes a point cloud, determining a point cloud occupancy probability value of the grid as a first probability value; when a grid in the reference grid map under the current field of view includes a point cloud, determining a point cloud occupancy probability value of the grid as a second probability value, where the second probability value is greater than the first probability value; and determining the occupancy grid map under the current field of view according to the point cloud occupancy probability value of each grid in the reference grid map under the current field of view.

In an embodiment, the processor, when executing the computer program, may further implement the following steps of:

determining a maximum point cloud height in each grid according to the height information of the point cloud in the reference grid map under the current field of view, as the point cloud height value of each grid; and forming the height grid map under the current field of view according to the point cloud height value of each grid and the height grid map under a previous field of view, where a point cloud acquisition moment corresponding to the current field of view is adjacent to a point cloud acquisition moment corresponding to the previous field of view.

In an embodiment, the processor, when executing the computer program, may further implement the following steps of:

comparing the point cloud height value of the grid at the corresponding position under the previous field of view to the point cloud height value of the grid under the current field of view, determining a maximum point cloud height value as the point cloud height value of the grid at the corresponding position, and forming the height grid map under the current field of view.

In an embodiment, the processor, when executing the computer program, may further implement the following steps of:

determining a visible height value in each grid according to the point cloud height values in the height grid map; determining the point cloud occupancy probability value and the point cloud height value of the grid at the corresponding position in the occupancy grid map and the height grid map, updating the point cloud occupancy probability value in the target grid map of the target scene according to the visible height value, the point cloud occupancy probability value, and the point cloud height value of the grid at the corresponding position, where the target grid map is the blank grid map when the current field of view corresponds to a first acquisition of the point cloud, and the target grid map is determined under the previous field of view when the current field of view corresponds to a non-first acquisition of the point cloud.

In an embodiment, the processor, when executing the computer program, may further implement the following steps of:

increasing the point cloud occupancy probability value of the grid at the corresponding position in the target grid map according to a preset increase parameter when the point cloud occupancy probability value of the grid at the corresponding position indicates that the grid at the corresponding position is occupied; and updating the point cloud occupancy probability value of the grid at the corresponding position in the target grid map according to the point cloud height value and the visible height of the grid at the corresponding position when the point cloud occupancy probability value of the grid at the corresponding position indicates that the grid at the corresponding position is not occupied.

In an embodiment, the processor, when executing the computer program, may further implement the following steps of:

decreasing the point cloud occupancy probability value of the grid at the corresponding position in the target grid map according to a preset decrease parameter when the point cloud height value of the grid at the corresponding position is greater than the visible height; and keeping the point cloud occupancy probability value of the grid at the corresponding position in the target grid map unchanged when the point cloud height value of the grid at the corresponding position is less than or equal to the visible height.

In an embodiment, a computer readable storage medium is provided, on which a computer program is stored, and the computer program, when executed by a processor, may cause the processor to implement the following steps of:

acquiring a point cloud of a target scene under a current field of view; constructing an occupancy grid map and a height grid map under the current field of view according to the point cloud under the current field of view, where the occupancy grid map includes a point cloud occupancy probability value of each grid, the height grid map includes a point cloud height value of each grid, and the occupancy grid map corresponds to the height grid map; updating a target grid map of the target scene according to point cloud occupancy probability values in the occupancy grid map and point cloud height values in the height grid map.

In an embodiment, the computer program, when executed by a processor, may further cause the processor to implement the following steps of:

mapping the point cloud under the current field of view to a blank grid map, and obtaining a reference grid map under the current field of view; determining the occupancy grid map under the current field of view according to distribution information of a point cloud in the reference grid map under the current field of view and a height grid map at a previous field of view; and determining the height grid map under the current field of view according to height information of the point cloud in the reference grid map under the current field of view and the height grid map under the previous field of view.

In an embodiment, the computer program, when executed by a processor, may further cause the processor to implement the following steps of:

when a grid in the reference grid map under the current field of view excludes a point cloud, determining a point cloud occupancy probability value of the grid as a first probability value; when a grid in the reference grid map under the current field of view includes a point cloud, determining a point cloud occupancy probability value of the grid as a second probability value, where the second probability value is greater than the first probability value; and determining the occupancy grid map under the current field of view according to the point cloud occupancy probability value of each grid in the reference grid map under the current field of view.

In an embodiment, the computer program, when executed by a processor, may further cause the processor to implement the following steps of:

determining a maximum point cloud height in each grid according to the height information of the point cloud in the reference grid map under the current field of view, as the point cloud height value of each grid; and forming the height grid map under the current field of view according to the point cloud height value of each grid and the height grid map under a previous field of view, where a point cloud acquisition moment corresponding to the current field of view is adjacent to a point cloud acquisition moment corresponding to the previous field of view.

In an embodiment, the computer program, when executed by a processor, may further cause the processor to implement the following steps of:

comparing the point cloud height value of the grid at the corresponding position under the previous field of view to the point cloud height value of the grid under the current field of view, determining a maximum point cloud height value as the point cloud height value of the grid at the corresponding position, and forming the height grid map under the current field of view.

In an embodiment, the computer program, when executed by a processor, may cause the processor to implement the following steps of:

determining a visible height value in each grid according to the point cloud height values in the height grid map; determining the point cloud occupancy probability value and the point cloud height value of the grid at the corresponding position in the occupancy grid map and the height grid map; updating the point cloud occupancy probability value in the target grid map of the target scene according to the visible height value, the point cloud occupancy probability value, and the point cloud height value of the grid at the corresponding position, where the target grid map is the blank grid map when the current field of view corresponds to a first acquisition of the point cloud, and the target grid map is determined under the previous field of view when the current field of view corresponds to a non-first acquisition of the point cloud.

In an embodiment, the computer program, when executed by a processor, may further cause the processor to implement the following steps of:

increasing the point cloud occupancy probability value of the grid at the corresponding position in the target grid map according to a preset increase parameter when the point cloud occupancy probability value of the grid at the corresponding position indicates that the grid at the corresponding position is occupied; and updating the point cloud occupancy probability value of the grid at the corresponding position in the target grid map according to the point cloud height value and the visible height of the grid at the corresponding position when the point cloud occupancy probability value of the grid at the corresponding position indicates that the grid at the corresponding position is not occupied.

In an embodiment, the computer program, when executed by a processor, may further cause the processor to implement the following steps of:

decreasing the point cloud occupancy probability value of the grid at the corresponding position in the target grid map according to a preset decrease parameter when the point cloud height value of the grid at the corresponding position is greater than the visible height; and keeping the point cloud occupancy probability value of the grid at the corresponding position in the target grid map unchanged when the point cloud height value of the grid at the corresponding position is less than or equal to the visible height.

In an embodiment, a computer program product is provided, including a computer program. The computer program, when executed by a processor, may cause the processor to implement the following steps of:

acquiring a point cloud of a target scene under a current field of view; constructing an occupancy grid map and a height grid map under the current field of view according to the point cloud under the current field of view, where the occupancy grid map includes a point cloud occupancy probability value of each grid, the height grid map includes a point cloud height value of each grid, and the occupancy grid map corresponds to the height grid map, updating a target grid map of the target scene according to point cloud occupancy probability values in the occupancy grid map and point cloud height values in the height grid map.

In an embodiment, the computer program, when executed by a processor, may further cause the processor to implement the following steps of:

mapping the point cloud under the current field of view to a blank grid map, and obtaining a reference grid map under the current field of view; determining the occupancy grid map under the current field of view according to distribution information of a point cloud in the reference grid map under the current field of view and a height grid map at a previous field of view; and determining the height grid map under the current field of view according to height information of the point cloud in the reference grid map under the current field of view and the height grid map under the previous field of view.

In an embodiment, the computer program, when executed by a processor, may further cause the processor to implement the following steps of:

when a grid in the reference grid map under the current field of view excludes a point cloud, determining a point cloud occupancy probability value of the grid as a first probability value; when a grid in the reference grid map under the current field of view includes a point cloud, determining a point cloud occupancy probability value of the grid as a second probability value, where the second probability value is greater than the first probability value; and determining the occupancy grid map under the current field of view according to the point cloud occupancy probability value of each grid in the reference grid map under the current field of view.

In an embodiment, the computer program, when executed by a processor, may further cause the processor to implement the following steps of:

determining a maximum point cloud height in each grid according to the height information of the point cloud in the reference grid map under the current field of view, as the point cloud height value of each grid; and forming the height grid map under the current field of view according to the point cloud height value of each grid and the height grid map under a previous field of view, where a point cloud acquisition moment corresponding to the current field of view is adjacent to a point cloud acquisition moment corresponding to the previous field of view.

In an embodiment, the computer program, when executed by a processor, may further cause the processor to implement the following steps of:

comparing the point cloud height value of the grid at the corresponding position under the previous field of view to the point cloud height value of the grid under the current field of view, determining a maximum point cloud height value as the point cloud height value of the grid at the corresponding position, and forming the height grid map under the current field of view.

In an embodiment, the computer program, when executed by a processor, may cause the processor to implement the following steps of:

determining a visible height value in each grid according to the point cloud height values in the height grid map: determining the point cloud occupancy probability value and the point cloud height value of the grid at the corresponding position in the occupancy grid map and the height grid map; updating the point cloud occupancy probability value in the target grid map of the target scene according to the visible height value, the point cloud occupancy probability value, and the point cloud height value of the grid at the corresponding position, where the target grid map is the blank grid map when the current field of view corresponds to a first acquisition of the point cloud, and the target grid map is determined under the previous field of view when the current field of view corresponds to a non-first acquisition of the point cloud.

In an embodiment, the computer program, when executed by a processor, may further cause the processor to implement the following steps of:

increasing the point cloud occupancy probability value of the grid at the corresponding position in the target grid map according to a preset increase parameter when the point cloud occupancy probability value of the grid at the corresponding position indicates that the grid at the corresponding position is occupied; and updating the point cloud occupancy probability value of the grid at the corresponding position in the target grid map according to the point cloud height value and the visible height of the grid at the corresponding position when the point cloud occupancy probability value of the grid at the corresponding position indicates that the grid at the corresponding position is not occupied.

In an embodiment, the computer program, when executed by a processor, may further cause the processor to implement the following steps of:

decreasing the point cloud occupancy probability value of the grid at the corresponding position in the target grid map according to a preset decrease parameter when the point cloud height value of the grid at the corresponding position is greater than the visible height; and keeping the point cloud occupancy probability value of the grid at the corresponding position in the target grid map unchanged when the point cloud height value of the grid at the corresponding position is less than or equal to the visible height.

Those of ordinary skill in the art can understand that all or part of the processes in the methods of the above embodiments can be completed by instructing relevant hardware through a computer program. The computer program can be stored in a non-transitory computer-readable storage. When executed, the computer program may implement the processes of the above method embodiments. Any reference to memory, storage, database or other media used in the embodiments provided in the present application may include at least one of non-transitory and transitory memory. The non-transitory memory may include read-only memory (ROM), magnetic tape, floppy disk, flash memory or optical memory, etc. The transitory memory may include Random Access Memory (RAM) or external cache memory. By way of illustration but not limitation, the RAM can be in various forms, such as Static Random Access Memory (SRAM) or Dynamic Random Access Memory (DRAM), etc. The database involved in each embodiment provided in the present disclosure may include at least one of a relational database and a non-relational database. The non-relational databases may include, but are not limited to, distributed databases based on blockchain. The processor involved in each embodiment provided in the present disclosure may be a general-purpose processor, a central processing unit, a graphics processor, a digital signal processor, a programmable logic unit, a data processing logic unit based on quantum computing, etc., but is not limited thereto.

The technical features in the above embodiments can be combined in any way. To simplify the description, not all possible combinations of the technical features in the above embodiments are described. However, as long as there is no contradiction in the combination of these technical features, all possible combinations should be regarded as being within the scope of the present application.

The above-described embodiments only express several implementation modes of the present application, and the descriptions are relatively specific and detailed, but should not be construed as limiting the scope of the present application. It should be noted that, those of ordinary skill in the art can make several modifications and improvements without departing from the concept of the present application, and these all fall within the protection scope of the present application. Therefore, the protection scope of the present application should be subject to the appended claims.

What is claimed is:

1. A grid map construction method, comprising:

acquiring a point cloud of a target scene under a current field of view;

constructing an occupancy grid map and a height grid map under the current field of view according to the point cloud under the current field of view, wherein the occupancy grid map comprises a point cloud occupancy probability value of each grid, the height grid map comprises a point cloud height value of each grid, and the occupancy grid map corresponds to the height grid map;

determining a visible height value in each grid according to the point cloud height values in the height grid map;

determining a point cloud occupancy probability value and a point cloud height value of a grid at a corresponding position in the occupancy grid map and the height grid map;

increasing the point cloud occupancy probability value of the grid at the corresponding position in a target grid map according to a preset increase parameter when the point cloud occupancy probability value of the grid at the corresponding position indicates that the grid at the corresponding position is occupied;

when the point cloud occupancy probability value of the grid at the corresponding position indicates that the grid at the corresponding position is not occupied, decreasing the point cloud occupancy probability value of the grid at the corresponding position in the target grid map according to a preset decrease parameter when the point cloud height value of the grid at the corresponding position is greater than the visible height, and keeping the point cloud occupancy probability value of the grid at the corresponding position in the target grid map unchanged when the point cloud height value of the grid at the corresponding position is less than or equal to the visible height;

wherein the target grid map is a blank grid map when the current field of view corresponds to a first acquisition of the point cloud, and the target grid map is determined under a previous field of view when the current field of view corresponds to a non-first acquisition of the point cloud.

2. The method according to claim 1, wherein the constructing the occupancy grid map and the height grid map under the current field of view according to the point cloud under the current field of view comprises:

mapping the point cloud under the current field of view to a blank grid map, and obtaining a reference grid map under the current field of view;

determining the occupancy grid map under the current field of view according to distribution information of a point cloud in the reference grid map under the current field of view;

determining the height grid map under the current field of view according to height information of the point cloud in the reference grid map under the current field of view and a height grid map under a previous field of view.

3. The method according to claim 2, wherein the determining the occupancy grid map under the current field of view according to the distribution information of the point cloud in the reference grid map under the current field of view comprises:

when a grid in the reference grid map under the current field of view excludes a point cloud, determining a point cloud occupancy probability value of the grid as a first probability value;

when a grid in the reference grid map under the current field of view includes a point cloud, determining a point cloud occupancy probability value of the grid as a second probability value, wherein the second probability value is greater than the first probability value;

determining the occupancy grid map under the current field of view according to a point cloud occupancy probability value of each grid in the reference grid map under the current field of view.

4. The method according to claim 2, wherein the determining the height grid map under the current field of view according to the height information of the point cloud in the reference grid map under the current field of view and the height grid map under the previous field of view comprises:

determining a maximum point cloud height value in each grid according to the height information of the point cloud in the reference grid map under the current field of view, as the point cloud height value of each grid;

forming the height grid map under the current field of view according to the point cloud height value of each grid and the height grid map under the previous field of view, wherein a point cloud acquisition moment corresponding to the current field of view is adjacent to a point cloud acquisition moment corresponding to the previous field of view.

5. The method according to claim 4, wherein the forming the height grid map under the current field of view according to the point cloud height value of each grid and the height grid map under the previous field of view comprises:

comparing a point cloud height value of a grid at a corresponding position under the previous field of view to the point cloud height value of the grid under the current field of view;

determining a maximum point cloud height value as the point cloud height value of the grid at the corresponding position, and forming the height grid map under the current field of view.

6. A grid map construction apparatus, comprising: a point cloud acquisition module, a map construction module, and a map update module; wherein the point cloud acquisition module is configured to acquire a point cloud of a target scene under a current field of view;

the map construction module is configured to construct an occupancy grid map and a height grid map under the current field of view according to the point cloud under the current field of view, wherein the occupancy grid map comprises a point cloud occupancy probability value of each grid, and the height grid map comprises a point cloud height value of each grid, and the occupancy grid map corresponds to the height grid map;

the map update module is configured to update a target grid map of the target scene according to point cloud occupancy probability values in the occupancy grid map and point cloud height values in the height grid map;

wherein the map update module is further configured to:

determine a visible height value in each grid according to the point cloud height values in the height grid map;

determine the point cloud occupancy probability value and the point cloud height value of the grid at the corresponding position in the occupancy grid map and the height grid map;

update the point cloud occupancy probability value in the target grid map of the target scene according to the visible height value, the point cloud occupancy probability value, and the point cloud height value of the grid at the corresponding position;

wherein the target grid map is a blank grid map when the current field of view corresponds to a first acquisition of the point cloud, and the target grid map is determined under the previous field of view when the current field of view corresponds to a non-first acquisition of the point cloud;

wherein the map update module is further configured to:

increase the point cloud occupancy probability value of the grid at the corresponding position in the target grid map according to a preset increase parameter when the point cloud occupancy probability value of the grid at the corresponding position indicates that the grid at the corresponding position is occupied;

update the point cloud occupancy probability value of the grid at the corresponding position in the target grid map according to the point cloud height value and the visible height of the grid at the corresponding position when the point cloud occupancy probability value of the grid at the corresponding position indicates that the grid at the corresponding position is not occupied;

wherein the map update module is further configured to:

decrease the point cloud occupancy probability value of the grid at the corresponding position in the target grid map according to a preset decrease parameter when the point cloud height value of the grid at the corresponding position is greater than the visible height;

keep the point cloud occupancy probability value of the grid at the corresponding position in the target grid map unchanged when the point cloud height value of the grid at the corresponding position is less than or equal to the visible height.

7. The apparatus according to claim 6, wherein the map construction module is further configured to:

map the point cloud under the current field of view to a blank grid map, and obtain a reference grid map under the current field of view;

determine the occupancy grid map under the current field of view according to distribution information of a point cloud in the reference grid map under the current field of view;

determine the height grid map under the current field of view according to height information of the point cloud in the reference grid map under the current field of view and a height grid map under a previous field of view.

8. The apparatus according to claim 7, wherein the map construction module is further configured to:

when a grid in the reference grid map under the current field of view excludes a point cloud, determine a point cloud occupancy probability value of the grid as a first probability value;

when a grid in the reference grid map under the current field of view includes a point cloud, determine a point cloud occupancy probability value of the grid as a second probability value, wherein the second probability value is greater than the first probability value;

determine the occupancy grid map under the current field of view according to the point cloud occupancy probability value of each grid in the reference grid map under the current field of view.

9. The apparatus according to claim 7, wherein the map construction module is configured to:

determine a maximum point cloud height in each grid according to the height information of the point cloud in the reference grid map under the current field of view, as the point cloud height value of each grid;

form the height grid map under the current field of view according to the point cloud height value of each grid and the height grid map under the previous field of view, wherein a point cloud acquisition moment corresponding to the current field of view is adjacent to a point cloud acquisition moment corresponding to the previous field of view.

10. The apparatus according to claim 9, wherein the map construction module is further configured to:

compare the point cloud height value of the grid at the corresponding position under the previous field of view to the point cloud height value of the grid under the current field of view;

determine a maximum point cloud height value as the point cloud height value of the grid at the corresponding position, and form the height grid map under the current field of view.

11. A robot, comprising a processor and a memory storing a computer program, wherein when executing the computer program, the processor is configured to implement the method of claim 1.

12. A computer-readable storage medium, on which a computer program is stored, wherein the computer program, when executed by a processor, causes the processor to implement the method of claim 1.

13. A computer program product, comprising a computer program, wherein the computer program, when executed by a processor, causes the processor to implement the method of claim 1.

* * * * *